United States Patent
Kaliski, Jr. et al.

(10) Patent No.: US 11,005,856 B2
(45) Date of Patent: May 11, 2021

(54) STRENGTHENING INTEGRITY ASSURANCES FOR DNS DATA

(71) Applicant: VERISIGN, INC., Reston, VA (US)

(72) Inventors: Burton S. Kaliski, Jr., McLean, VA (US); Eric Osterweil, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 16/143,232

(22) Filed: Sep. 26, 2018

(65) Prior Publication Data

US 2019/0044955 A1    Feb. 7, 2019

Related U.S. Application Data

(63) Continuation of application No. 15/221,867, filed on Jul. 28, 2016, now Pat. No. 10,110,614.

(51) Int. Cl.
*H04L 29/06* (2006.01)
*H04L 29/12* (2006.01)

(52) U.S. Cl.
CPC ........ *H04L 63/126* (2013.01); *H04L 61/1511* (2013.01); *H04L 63/123* (2013.01); *H04L 61/6004* (2013.01); *H04L 63/1483* (2013.01)

(58) Field of Classification Search
CPC ..... H04L 29/06; H04L 29/12; H04L 63/6004; H04L 63/1483; H04L 63/126; H04L 63/123; H04L 61/1511; H04L 61/6004
See application file for complete search history.

(56) References Cited

U.S. PATENT DOCUMENTS

| | | | |
|---|---|---|---|
| 8,626,950 B1 * | 1/2014 | MacCarthaigh | .... H04L 61/1511 709/223 |
| 8,874,790 B2 | 10/2014 | McPherson | |
| 9,473,516 B1 | 10/2016 | Jezorek et al. | |
| 10,110,614 B2 | 10/2018 | Kaliski, Jr. et al. | |
| 10,530,734 B2 | 1/2020 | Kaliski, Jr. et al. | |
| 2003/0182447 A1 | 9/2003 | Schilling | |
| 2004/0194102 A1 | 9/2004 | Neerdaels | |
| 2005/0259645 A1 | 11/2005 | Chen et al. | |
| 2006/0088039 A1 | 4/2006 | Kakivaya et al. | |
| 2006/0129665 A1 | 6/2006 | Toebes et al. | |
| 2007/0160200 A1 | 7/2007 | Ishikawa et al. | |
| 2009/0157889 A1 | 6/2009 | Treuhaft | |

(Continued)

FOREIGN PATENT DOCUMENTS

EP    2779591 A2    9/2014
KR    10-2007-0113600 A    11/2007

OTHER PUBLICATIONS

Eric Osterweil et al., "Verifying Keys through Publicity and Communities of Trust: Quantifying Off-Axis Corroboration." IEEE Transactions on Parallel and Distributed Systems, vol. 25, No. 2, 2014, pp. 283-291.

(Continued)

*Primary Examiner* — Mahfuzur Rahman
(74) *Attorney, Agent, or Firm* — MH2 Technology Law Group, LLP

(57) ABSTRACT

One or more DNS services are provided that are configured to not only tolerate some commonly observed DNSSEC misconfigurations (while still providing DNSSEC's security guarantees), but also provide a more intelligent DNS resolution process informed by DNSSEC.

20 Claims, 6 Drawing Sheets

(56) References Cited

U.S. PATENT DOCUMENTS

| | | | |
|---|---|---|---|
| 2010/0121981 A1* | 5/2010 | Drako | H04L 61/1511 709/245 |
| 2012/0054497 A1 | 3/2012 | Korhonen | |
| 2013/0173825 A1* | 7/2013 | McPherson | H04L 61/1511 709/245 |
| 2013/0254423 A1 | 9/2013 | George, IV | |
| 2013/0290563 A1* | 10/2013 | Fleischman | H04L 61/1511 709/245 |
| 2014/0155018 A1* | 6/2014 | Fan | H04W 76/50 455/404.1 |
| 2014/0244998 A1 | 8/2014 | Amenedo et al. | |
| 2014/0304412 A1 | 10/2014 | Prakash et al. | |
| 2015/0074221 A1 | 3/2015 | Kuparinen et al. | |
| 2015/0180892 A1 | 6/2015 | Balderas | |
| 2015/0271031 A1* | 9/2015 | Beevers | G06F 16/29 709/224 |
| 2015/0295882 A1 | 10/2015 | Kaliski, Jr. | |
| 2015/0304199 A1 | 10/2015 | Leask et al. | |
| 2016/0021055 A1* | 1/2016 | Krzywonos | H04L 61/305 709/245 |
| 2016/0036848 A1 | 2/2016 | Reddy et al. | |
| 2016/0173439 A1 | 6/2016 | Kaliski, Jr. et al. | |
| 2016/0197898 A1 | 7/2016 | Hozza et al. | |
| 2017/0048186 A1* | 2/2017 | Blinn | H04L 61/1552 |
| 2018/0034827 A1 | 2/2018 | Kaliski, Jr. et al. | |
| 2019/0097965 A1* | 3/2019 | Linari | H04L 61/1511 |

OTHER PUBLICATIONS

Eric Osterweil, "Measurable Security: a New Substrate for DNSSEC", Dissertation submitted to the University of California at Los Angeles, 2010, pp. 1-177.

Eric Osterweil et al., "Deploying and Monitoring DNS Security (DNSSEC)." In Computer Security Applications Conference, 2009. ACSAC'09, pp. 429-438.

Venugopalan Ramasubramanian et al., "The Design and Implementation of a Next Generation Name Service for the Internet", In ACM SIGCOMM Computer Communication Review, vol. 34, No. 4, 2004, pp. 331-342.

Kyoungsoo Park et al., "CoDNS: Improving DNS Performance and Reliability via Cooperative Lookups", USENIX Association OSDI '04: 6th Symposium on Operating Systems Design and Implementation, vol. 4, 2004, pp. 199-214.

Russ Cox et al., "Serving DNS Using a Peer-to-Peer Lookup Service." International Workshop on Peer-To-Peer Systems. Springer Berlin Heidelberg, 2002, pp. 1-7.

Z. Hu et al., "Specification for DNS over Transport Layer Security", IETF RFC 7858, 2016, pp. 1-18.

E. Lewis et al., "DNS Zone Transfer Protocol (AXFR)", IETF RFC 5936, 2010, pp. 1-28.

Namecoin, Retrieved from the internet on Jul. 20, 2016, http://namecoin.info/, pp. 1-5.

Florian Weimer, "Passive DNS Replication", First Conference on Computer Security Incident, 2005, pp. 1-13.

D. Zhang et al., "Certificate Transparency for Domain Name System Security Extensions", Internet-Draft draft-zhang-trans-ct-dnssec-03, Jul. 5, 2015, pp. 1-13.

Extended European Search Report dated Dec. 4, 2017, European Application No. 17183682.8, pp. 1-7.

Anonymous: RSSAC-001, "Service Expectations of Root Servers", XP055273350, Retrieved from the Internet: URL: https://www.icann.org/en/systemlfiles/files/rssac-001-rafl-02may13-en.pdf [retrieved on May 18, 2016], sections 3.8.2 and 4, May 2, 2013, pp. 1-10.

Savolainen et al., "Improved Recursive DNS Server Selection for Multi-Interfaced Nodes", RFC 6731, Internet Engineering Task Force, IETF; Standard, Internet Society (ISOC) 4, Geneva, Switzerland, Dec. 19, 2012, pp. 12-14, (29 pages).

Damas et al., "Extension Mechanisms for DNS (EDNS(0))", RFC 6891, Internet Engineering Task Force, IETF; Standard, Internet Society (ISOC) 4, Geneva, Switzerland, Apr. 17, 2013, pp. 1-16.

Sevilla et al., "iDNS: Enabling Information Centric Networking Through The DNS"2014 IEEE Conference on Computer Communications Workshops (Infocom WKSHPS), IEEE, Apr. 27, 2014, pp. 476-481.

Nagele, Wolfgang, "Analysis of Increased Query Load on Root Name Servers", RIPE Labs, Retrieved from the Internet, URL: http://labs.ripe.net/Members/wnagele/analysis-of-increased-query-load-on-root-name-servers [retrieved on May 18, 2016], Jul. 11, 2011, 6 pages.

Anonymous: "ICANN: ccTLD Constituency Draft Contract for Services", 8th Draft, Nov. 14, 2000, Retrieved from the Internet: URL: http://archive.icann.org/en/cctlds/cctldconst-8th-draft-contract-14nov00.htm [retrieved on May 18, 2016], Nov. 14, 2000, 4 pages.

Edmonds, R., "Signaling DNS Capabilities, draft-edmonds-dnsop-capabilities-00", https://datatracker.ietf.org/doc/draft-edmonds-dnsop-capabilities/, Jul. 2, 2017, 7 pages.

"Domain Name System (DNS) Parameters," "https://www.iana.org/assignments/dns-parameters/dns-parameters.xhtml#dns-parameters-1", Aug. 30, 2017, 4 pages.

Herzberg et al., "Negotiating DNSSEC Algorithms Over Legacy Proxies", International Conference on Cryptology and Network Security, Springer, DOI:10.1007/978-3-319-12280-9_8, Oct. 2014, pp. 1-16.

Herzberg et al., "Less is More: Cipher-Suite Negotiation for DNSSEC," Proceedings of the 30th Annual Computer Security Applications Conference. ACM, http://dx.doi.org/10.1145/2664243.2664283, Dec. 8-12, 2014, 10 pages.

Huque et al., "Algorithm Negotiation in DNSSEC, draft-huque-dnssec-alg-nego-01", https://datatracker.ietf.org/doc/draft-huque-dnssec-alg-nego/, Jul. 20, 2017, 7 pages.

Shaikh et al., "On the Effectiveness of DNS-based Server Selection", Proceedings IEEE Infocom 2001, vol. 3, DOI: 10.1109/INFCOM.2001.916678, Apr. 22-26, 2001, pp. 1801-1810.

Shimokawa et al., "Flexible Server Selection in Widely Distributed Environments", Research Reports on Information Science and Electrical Engineering, vol. 5, No. 1, Mar. 2000, pp. 7-12.

Daley, G., "Use of DNS SRV records for host selection; draft-daley-dnsext-host-srv-00.txt", Dec. 31, 2009, 13 pages.

Herzberg et al., "Cipher-Suite Negotiation for DNSSEC: Hop-by-Hop or End-to-End?", IEEE Internet Computing, vol. 19, No. 1, https://www.researchgate.net/profile/Amir_Herzberg/publication/272385849 Cipher-suite_ negotiation for_ DNSSEC Hop-by-hop_or_ end-to-end/inks/54ee39730cf2e283086459ec.pdf, 2015, pp. 80-84.

Trusted Automated exchange of Indicator Information. http://taxii.mitre.org/. Accessed Dec. 16, 2014.

Managed Incident Lightweight Exchange (mile). http://datatracker.ieff.org/wg/mile/documents/. Accessed Dec. 16, 2014.

Vixie, Paul, "Passive DNS and ISC SIE", Presented at DNS-OARC Workshop, https://indico.dns-oarc.net/contributionDisplay.py?contribId=4&confid=8, Nov. 2-3, 2007, 10 pages.

Verisign Labs, "New gTLD Security and Stability Considerations", https://www.verisigninc.com/assets/gtld-ssr-v2.1-final.pdf, Mar. 2013, pp. 1-10.

Verisign Labs, "New gTLD Security, Stability, Resiliency Update: Exploratory Consumer Impact Analysis", http://techreports.verisignlabs.com/docs/tr-1140008-1.pdf, Aug. 22, 2013, pp. 1-28.

DNS-OARC, "Domain Name System Operations Analysis and Research Center", https://www.dnsoarc.net/, Accessed Dec. 16, 2014, 3 pages.

Osterweil et al., "Opportunistic Encryption with DANE Semantics and IPsec: IPSECA", Internet-Draft draft-osterweil-dane-ipsec-03, https://datatracker.ietf.org/doc/draft-osterweil-dane-ipsed, Jul. 6, 2015, pp. 1-19.

Hu et al., "Starting TLS over DNS", Internet-Draft draft-hzhwm-start-tls-for-dns-01, https://datatracker.ieff.org/doc,/draft-hzhwm-start-tlsfor-dns/, Jul. 4, 2014, pp. 1-12.

Bortzmeyer, S. "DNS Query Name Minimisation to Improve Privacy", Internet-Draft draft-ieffdnsop-qname-minimisation-00, https://datatracker.ieff.org/doc/draft-ieff-dnsopqname-minimisation/, Oct. 22, 2014, pp. 1-7.

Public Suffix List, https://publicsuffix.org/, Accessed Dec. 16, 2014, 1 page.

(56) References Cited

OTHER PUBLICATIONS

Elz at al., "Clarifications to the DNS Specification", RFC 2181, http://tools.ieff.org/html/rfc2181, Jul. 1997, pp. 1-15.

Kumari et al., "Decreasing Access Time to Root Servers by Running One on Loopback", Internet-Draft draft-wkumari-dnsop-root-loopback-00, http://tools.ielf.org/html/draft-wkumari-dnsop-root-loopback-00, Oct. 25, 2014, pp. 1-5.

Lee et al., "How to Scale the DNS Root System?", Internet-Draft draft-lee-dnsop-scalingroot-00.txt, http://tools.ieff.org/html/draft-lee-dnsopscalingroot-00, Jul. 3, 2014, pp. 1-11.

Arends et al., "Resource Records for the DNS Security Extensions", RFC 4034, https://datatracker.ietf.org/doc,/rfc40341, Mar. 2005, pp. 1-29.

ICANN Root Server System Advisory Committee (RSSAC), "RSSAC-002: RSSAC Advisory on Measurements of the Root Server System", https://www.icann.org/en/system/files/files/rssac-002-measurements-root-20nov14-en.pdf, Nov. 20, 2014, 15 pages.

ICANN, "Identifier Technology Innovation Panel-Draft Report", http://www.icann.org/en/about/planning/strategic-engagement/identifier-technology/report-21feb14-en_pdf, Feb. 21, 2014, pp. 1-52.

VeriSign, Inc., "Comments on Identifier Technology Innovation Panel Draft Report", http://mm.icann.org/pipermail/tipanel/attachments/20140430/361e539a/verisign-commentsiti-panel-2014-04-30-0001.pdf, Apr. 30, 2014.

Information-Centric Networking Research Group (ICNRG), https://irtf.org/icnrg, Accessed Dec. 16, 2014, 4 pages.

About getdns, http://getdnsapi.net/, Accessed Dec. 10, 2014, pp. 1-6.

"Assign a Conditional Forwarder for a Domain Name", https://docs.microsoft.comien-us/previous-versions/windows/it-pro/windows-server-2008-R2-and-2008/cc794735(v=ws_10)?redirectedfrom=MSDN, Jul. 2, 2012, 2 pages.

Extended European Search Report for European Application No. 15200405.7, dated May 30, 2016, 8 pages.

Extended European Search Report for European Application No. 19173127.2 dated Oct. 7, 2019, 12 pages.

Communication pursuant to Article 94(3) EPC dated Jul. 16, 2020 in corresponding European Application No. 19173127.2 (12 pages).

* cited by examiner

STRENGTHENING INTEGRITY ASSURANCES FOR DNS DATA

CROSS REFERENCE TO RELATED APPLICATIONS

The present application is a continuation of U.S. patent application Ser. No. 15/221,867 filed on Jul. 28, 2016, which is hereby incorporated by reference in its entirety.

FIELD

The present disclosure relates generally to domain name system ("DNS") security extensions ("DNSSEC").

BACKGROUND

DNSSEC is a suite of Internet Engineering Task Force (IETF) specifications for securing certain kinds of information provided by the DNS as used on Internet Protocol (IP) networks. It is a set of extensions to DNS, which provide to DNS users origin authentication of DNS data, authenticated denial of existence, and data integrity. All answers in DNSSEC are digitally signed. By checking the digital signature, a DNS user is able to check if the information is identical (correct and complete) to the information published at the authoritative DNS server.

DNSSEC was standardized in 2005 and uses a straightforward hierarchical verification architecture to learn keys and verify data. DNSSEC has become one component of naming and resolution services provided by DNS registry services. However, it has become apparent that DNSSEC's verification model does not adequately support the flexibility and robustness needed by Internet systems. DNSSEC's design verifies DNS data when deployment operates without benign misconfigurations. This is in contrast to DNS, which offers robustness to many types of misconfigurations. In a sense, DNSSEC presumes near-perfect operational deployments.

By way of a simplified example of a top-level domain (TLD) implementing DNSSEC, the DNS records in the TLD zone file are digitally signed using a private key. The corresponding public key is published as a DNSKEY record in the TLD zone file, and is given to the root name server's provisioning system, which digitally signs a DNS record containing the fingerprint of the public key (a Delegation Signer ("DS") record) with the root zone's private key. The root zone's public key may be retrieved directly by a relying party from a local trust list by a client application. A lookup request queries the trusted root zone for authoritative name server information for the TLD and for the associated public key fingerprint. The public key fingerprint is then used to verify the TLD's public key. This process keeps the chain of trust intact. Because a lookup request begins with a trusted node (the root server), each subsequent step in the chain of lookups maintains the trust by using the public/key private key infrastructure. Thus, once the TLD's public key is verified using the public key fingerprint from its "parent", the root zone, the TLD name server returns the public key fingerprint for the next authoritative name server, which is digitally signed with the TLD's private key. The next authoritative name server has also digitally signed its DNS records with a private key. The chain continues indefinitely until the last node is reached and the ultimate DNS record, e.g., a record containing a web server's IP address, is determined. (Note that in practice, the DNSSEC trust chain typically is slightly more complex, with two levels of keys per zone. A key-signing key signs DNSKEY records, and a zone-signing key signs other records, including the DS record containing the fingerprint of the next zone's key-signing key.)

If a failure occurs during at any stage of the DNSSEC chain of trust verification process, the requestor typically has no other mechanism to validate the requested DNS record. The requestor may be provided the DNS record and may have to make a determination as to whether the record is trustworthy. Alternatively, the requestor may not be provided the DNS record. In either case, the results are not optimal for the requestor. Thus, there is a need for a mechanism to validate DNS records when DNSSEC is not functioning properly, i.e., when DNSSEC is "imperfect."

SUMMARY

According to examples of the present disclosure, a method of resolving Domain Name System (DNS) queries is provided. The method comprises obtaining, at a first DNS recursive resolver, a first DNS query for a domain name record from a requestor; determining, by at least one hardware processor of the first DNS recursive resolver, that the first DNS recursive resolver does not contain an answer to the first DNS query stored in a memory; providing, by the first DNS recursive resolver, one or more queries to a respective one or more witnesses; obtaining, by the first DNS recursive resolver, one or more answers from the one or more witnesses; accessing, from a memory of the first DNS recursive resolver, a policy, wherein the policy specifies a type of associated evidence of correctness the requestor is willing to accept; determining, by at least one hardware processor of the first DNS recursive resolver, an answer to the first DNS query based on the policy, the one or more answers from the one or more witnesses, and evidence of correctness associated with at least one of: the one or more witnesses and the one or more answers; and providing, by the first DNS recursive resolver, the answer to the requestor.

According to examples of the present disclosure, a DNS recursive resolver is provided that comprise one or more processors; and a memory system comprising one or more non-transitory computer-readable media storing instructions that, when executed by at least one of the one or more processors, cause the DNS recursive resolver to perform operations for resolving Domain Name System (DNS) queries, the operations comprising: obtaining a first DNS query for a domain name record from a requestor; determining that the DNS recursive resolver does not contain an answer to the first DNS query stored in a memory; providing one or more queries to a respective one or more witnesses; obtaining one or more answers from the one or more witnesses; accessing a policy, wherein the policy specifies a type of associated evidence of correctness the requestor is willing to accept; determining an answer to the first DNS query based on the policy, one or more answers from the one or more witnesses, and evidence of correctness associated with at least one of: the one or more witnesses and the one or more answers; and providing the answer to the requestor.

According to examples of the present disclosure, a method of resolving Domain Name System (DNS) queries is provided. The method comprises obtaining, at a first DNS authoritative name server, a first DNS query for a domain name record from a requestor; providing, by the first DNS authoritative name server, one or more queries to a respective one or more witnesses; obtaining, by the first DNS authoritative name server, one or more answers from the one or more witnesses; accessing, from a memory of the first DNS authoritative name server, a policy, wherein the policy specifies a type of associated evidence of correctness the requestor is willing to accept; determining, by at least one hardware processor of the first DNS authoritative name server, an answer to the first DNS query based on the policy, the one or more answers from the one or more witnesses, and evidence of correctness associated with at least one of: the one or more witnesses and the one or more answers; and providing, by the first DNS authoritative name server, the answer to the requestor.

According to examples of the present disclosure, a DNS authoritative name server is provided and comprises one or more processors; and a memory system comprising one or more non-transitory computer-readable media storing instructions that, when executed by at least one of the one or more processors, cause the DNS recursive resolver to perform operations for resolving Domain Name System (DNS) queries, the operations comprising: obtaining, at a first DNS authoritative name server, a first DNS query for a domain name record from a requestor; providing, by the first DNS authoritative name server, one or more queries to a respective one or more witnesses; obtaining, by the first DNS authoritative name server, one or more answers from the one or more witnesses; accessing, from a memory of the first DNS authoritative name server, a policy, wherein the policy specifies a type of associated evidence of correctness the requestor is willing to accept; determining, by at least one hardware processor of the first DNS authoritative name server, an answer to the first DNS query based on the policy, the one or more answers from the one or more witnesses, and evidence of correctness associated with at least one of: the one or more witnesses and the one or more answers; and providing, by the first DNS authoritative name server, the answer to the requestor.

In some examples, the method can further comprise prior to the providing the one or more queries: providing a query to an authoritative name server; obtaining an answer from the authoritative name server; and determining that the answer is not secured using DNSSEC.

In some examples, the method can further comprise ranking a plurality of witnesses based on reputation and selecting the one or more witnesses to use to answer the first query based on the ranking.

In some examples, the associated evidence of correctness includes one or more metrics comprising a reputation score associated with a second DNS recursive resolver, a comparison of a DNSKEY record associated with the domain name record with other DNSKEY records from other open DNS recursive resolvers, a chain of trust associated with the domain name record, WHOIS and/or registration data associated with the domain name record, communications channel security indicators, a zone file, a zone modification request log, an error log, or a public ledger.

In some examples, the method of can further comprise providing, by the DNS recursive resolver, a request to a trusted third party for a list of witnesses; obtaining the list from the trusted third party; and selecting the witnesses from the list.

In some examples, the method can further comprise determining that one or more witnesses is better at a least one of: a particular task and a particular zone than others of a plurality of witnesses and selecting the one or more witnesses to use to answer the first DNS query based on the determining.

In some examples, the method can further comprise providing the evidence of correctness associated with the witnesses and/or the one or more answers to the requestor.

In some examples, a witness from the one or more witnesses is a DNS recursive resolver or is a non-resolver witness.

In some examples, the policy is associated with the requestor or is a global policy associated with all requestors.

It is to be understood that both the foregoing general description and the following detailed description are exemplary and explanatory only and are not restrictive of the implementations, as claimed.

DETAILED DESCRIPTION

Figure 1:
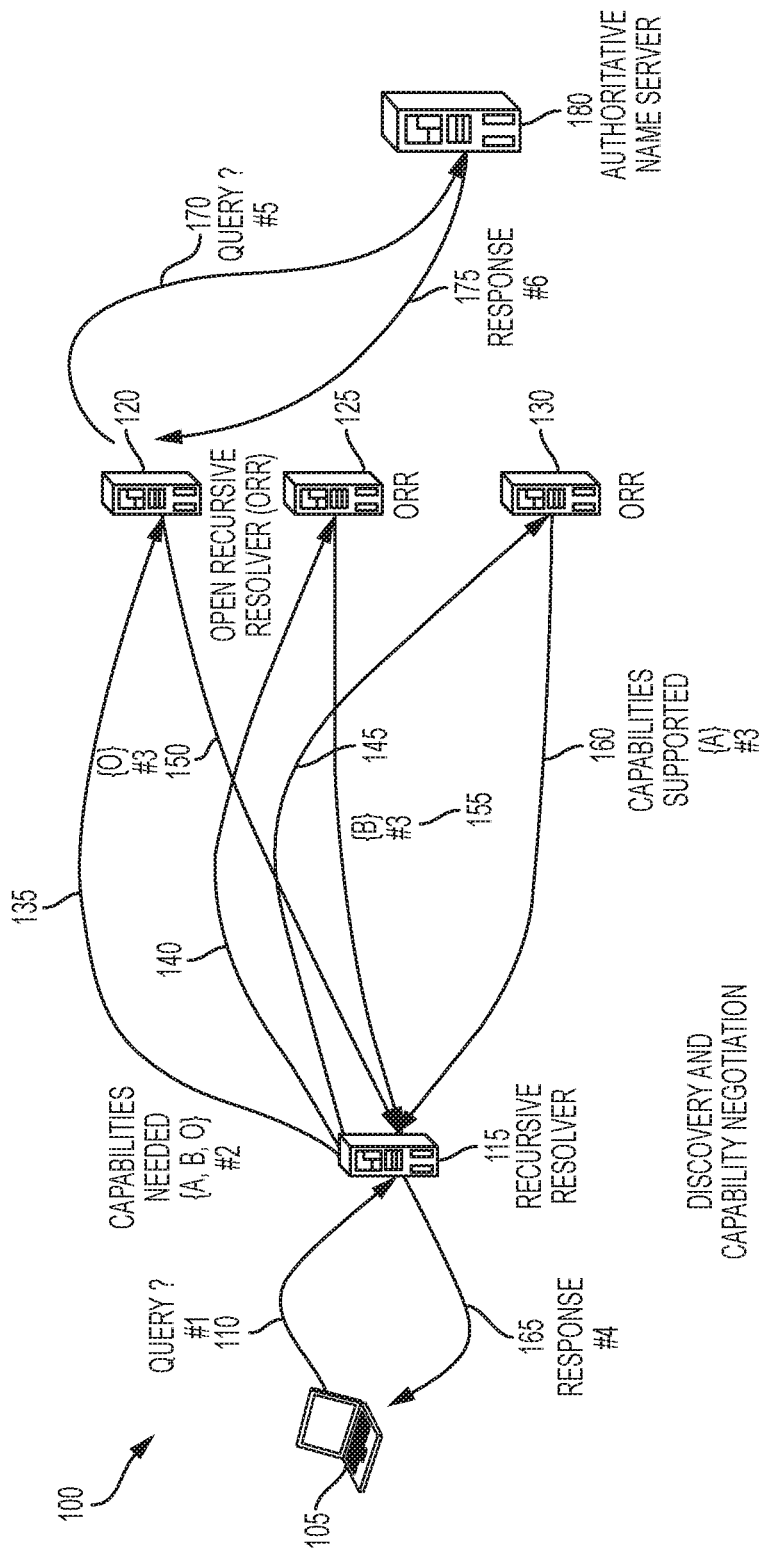
FIG. 1 shows a discovery and capability negotiation process, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, examples of the present disclosure provide DNS services that are configured to not only tolerate some commonly observed DNSSEC misconfigurations (while still providing DNSSEC's security guarantees), but also provide a more intelligent DNS resolution process informed by DNSSEC. Examples of the present disclosure enhance DNSSEC's robustness by adding one or more additional contributions. First, DNSSEC's simplistic architecture for verifying DNSKEY records and DNS content (via the delegation chain of trust) is augmented by creating an orthogonal concept for validating data. DNSSEC zones and content can be validated during verification failures of the DNSSEC chain of trust through other evidence (rather than just using the delegation chain of trust). Evidence-based validation can include, but is not limited to, using quantifiably diverse observations of DNSKEY consistency, using the chain of trust itself, incorporating reputation aspects of one or more witnesses, i.e., upstream recursive resolver(s), authoritative name server(s), etc., and drawing from integrity assurances provided when responses are delivered by a recursive resolver and/or authoritative name server over a secure communications channel (e.g., protected with DNS-over-TLS or another security protocol that provides integrity protection). To do this, one or more witnesses, such as the upstream recursive resolvers, can be diversely spread across one or more networks, thereby creating topologically diverse evidence for DNSSEC-secured answers and/or for DNS answers more generally. The one or more witnesses can include witnesses of the same type platforms, such as all the witnesses being open recursive resolvers ("ORRs") or can include mixed platforms, where one can be an ORR, another can be a private resolver, another can be a non-resolver that provides evidence for DNSSEC processing or other assurance that a DNS record is correct, and another can be an authoritative name server with a secure communications channel. Resolvers may vary in trustworthiness, e.g., some may be managed by well-known operators, and others' oversight may be uncertain or unknown. In general, evidence from more trusted resolvers may be preferred, although evidence from a set of resolvers that are less trusted, but are unlikely to collude with one another, may also be acceptable. Examples of non-resolvers that may provide assurance that a DNS record is correct include services that provide access to one or more of the following: zone files containing the DNS record or related DNSSEC keys; zone modification request logs containing the command sequence that resulted in the DNS record or related DNSSEC keys (including Extensible Provisioning Protocol (EPP) transaction logs, DNS operator command logs, and email request/response logs); error logs and "trouble tickets" indicating possible errors in the DNS record or related DNSSEC keys that may have since been corrected; "lookaside" validation zones providing lists of trusted DNSSEC keys; passive DNS databases and DNSSEC transparency logs offering relying parties' views of the DNS record or related DNSSEC keys; public ledgers, e.g., block chains, providing support for the DNS record or related DNSSEC keys; and alternate DNS data distribution networks. In addition, if there is more than one authoritative name server serving a DNS record and/or related DNSSEC key, each of the authoritative name servers may be considered as an additional witness for the record and/or key. Although in principle, each name server that is authoritative for a given DNS record or key should respond with the same copy of the record, in practice, responses may vary due to instability. Accordingly, it may be valuable for a resolver or other relying party to consult with more than one authoritative name server for information about a given DNS record or key similarly to the reliance on other non-resolver witnesses in cases of uncertainty. A query sent to a witness may be associated with a single DNS query, or may support multiple potential DNS queries (e.g., a request for a zone file). The query sent to the witness may be sent before, or after, the DNS query(ies) with which it is associated and/or that it supports. The query sent to a witness may or may not be a DNS query. The evidence exchanged among parties may be exchanged directly, e.g., the actual observations, records, logs, etc., and/or indirectly, e.g., identifiers of such information, pointers to the location(s) where such information may be obtained, hashes or digital signatures of such information, etc.

The evidence-based validation can include information obtained at a local DNS recursive resolver on behalf of a requestor based, at least in part, from one or more witnesses, i.e., ORRs, etc. The one or more witnesses can be discovered in an in-line process (during DNS resolution processes for a requestor) or in an out-of-band process (witnesses discovered separate from the DNS resolution process). The local DNS recursive resolver can be configured to negotiate capabilities needed by a requestor and offered by the one or more witnesses. The one or more witnesses can be configured to expose/export the provenance needed for evidence-based decisions. Other evidence-based validation information can include, but is not limited to, the reputation of the DNS provider for the authoritative name server, and WHOIS/registration data associated with a domain name. The WHOIS/registration data can be used to determine, among other things, changes of registrant and/or registrar that might affect the stability of the associated zone file and/or DNS records. Depending on the relying party's policy, DNS responses that do not have perfect DNSSEC validation, but are received over a secure connection with a resolver that includes the evidence-based validation information can be considered as providing the same assurance as DNS responses that do have perfect DNSSEC validation. Similarly, DNS responses that are received over a secure connection with an authoritative name server, but do not have perfect DNSSEC validation, can be considered as providing the same level of assurance.

Second, examples of the present disclosure provide for the arbitration of a single response to a requestor by evaluating responses from one or more witnesses, i.e., one or more upstream recursive resolvers—this is more general than the first example and is not limited to mitigating DNSSEC failures. Third, examples of the present disclosure provide for the determination that different recursive resolvers may be better/more trustworthy/more optimized/etc. for different zones and different features, i.e., Transport Layer Security Association (TLSA) records, privacy, etc. A relying party can select among one or more of multiple resolvers on the basis of the zone and/or feature of interest.

Examples of the present disclosure provide benefits including, but are not limited to, facilitating more operationally feasible transfers of zones between registrars and hosting providers (allowing zones to not go insecure during handoffs), protecting zones against validation failures if predecessor zones (higher in the delegation hierarchy) misconfigure DNSSEC (which would normally cause verification failures for all descendant zones), more secure responses, more heterogeneity of query response capabilities, faster resolution, increased privacy, and more nuanced privacy.

Rather than relying solely on DNSSEC's chain of trust secure delegation model, evidence-based validation with DNSSEC in accordance with examples of the present disclosure allows other evidence to be used to validate a DNSKEY record. For example, the other evidence can come from polling one or more of witnesses throughout the internet to see if the one or more witnesses have a record for the same DNSKEY record for the same DNS zone. A relying party's resolver can incorporate this evidence into its decision whether to trust a given DNSKEY record, e.g., based on a majority, or all, of the witnesses returning the same answer, or applying different weights to different witnesses based on reputation or other data. Then, the relying party's resolver can have some assurance that that DNSKEY record can be safely used to verify the digital signature on another DNS record that was requested, i.e., an A record, a MX record, etc.

More generally, evidence-based validation can complement DNSSEC by providing alternate forms of assurance that a DNS record is correct, e.g., if the DNS record was obtained from a reputable source and/or over a secure communications channel. Reputation and integrity assurances for witnesses may be based in part on authenticating a witness's identity and/or responses via a certificate and/or key. The certificate may further attest to certain properties of the witness, e.g., its compliance with privacy and/or security policies of potential interest to relying parties. The certificate, key, or associated information may be published via a DANE record. A relying party may decide whether to connect to a witness and/or rely on its responses based on these properties. In addition, although evidence-based validation is described here in the context of DNS records and DNSSEC, the approaches can also be applied in similar systems where records are authenticated with digital signatures and digital signatures are validated following a (potentially imperfect) chain of trust, e.g., Information-Centric Networking.

FIG. 1 shows a discovery and capability negotiation process 100, according to examples of the present disclosure. Computer (requestor) 105 composes DNS query 110 using, for example, a local stub resolver (not shown) that forms DNS query 110 according to a DNS protocol. Computer 105 provides DNS query 110 to local recursive resolver 115 over a network (not shown). Computer 105 is located in a domain, e.g., network, that is serviced by local recursive resolver 115. Local recursive resolver 115 maintains a list of witnesses that have been pre-discovered in a separate discovery process. The witnesses can be geographically dispersed in the network and/or across networks providing topologically diverse network information to local recursive resolver 115 and computer 105. The geographically dispersed witnesses can provide quantifiably diverse observations of DNSKEY consistency. Witnesses can vary based on suitability for different zones and features where a relying party can select among one or more resolvers on the basis of the zones and/or feature of interest. As shown in FIG. 1, witnesses are shown as three open recursive resolver ("ORR") 120, 125, 130; however, this is just one example of the witnesses. Witnesses can be of the same type or can include different mixture of types. Other examples of witnesses include private resolvers configured to service queries from at least local recursive resolver 115, and non-resolvers that provide evidence for DNSSEC processing. ORRs are resolvers that are configured, for example based on a local policy, to answer queries from any requestor, whereas local recursive resolver 115 is configured, based on a local policy, to answer queries from devices having a predetermined range of network addresses. In some examples, local recursive resolver 115 may be implemented directly on computer 105 without network communication between computer 105 and local recursive resolver 115 and/or may be integrated with a local stub resolver on computer 105 as a single process. Local recursive resolver 115 provides requests 135, 140, 145 to ORRs 120, 125, 130, respectively, to negotiate capabilities needed for computer 105 and/or for local recursive resolver 115. ORRs 120, 125, 130 provide answers 150, 155, 160, respectively, to local recursive resolver 115 and local recursive resolver 115 analyzes answers 150, 155, 160 to complete the capability negotiation. The capability negotiation may be performed in conjunction with the processing of DNS query 110 or separately as a configuration or maintenance operation. Local recursive resolver 115 may also send DNS queries (not shown) to and obtain DNS responses (not shown) from ORRs 120, 125, 130 as part of processing DNS query 110. Local recursive resolver 115 then provides response 165 to computer 105 according to the DNS protocol over a network (not shown). If the witness is not a private resolver then the operations may be substantially the same as just described. If the witness is a non-resolver then the capability negotiation may be substantially the same but local recursive resolver 115 may send non-DNS queries and obtain non-DNS responses to the witness as part of processing DNS query 110. Note that local recursive resolver 115 and ORRs 120, 125, 130 may also send DNS queries 170 to and obtain DNS responses 180 from one or more authoritative name servers 175 as part of processing DNS query 110 (interaction shown only from ORR 120 in figure).

Figure 2:
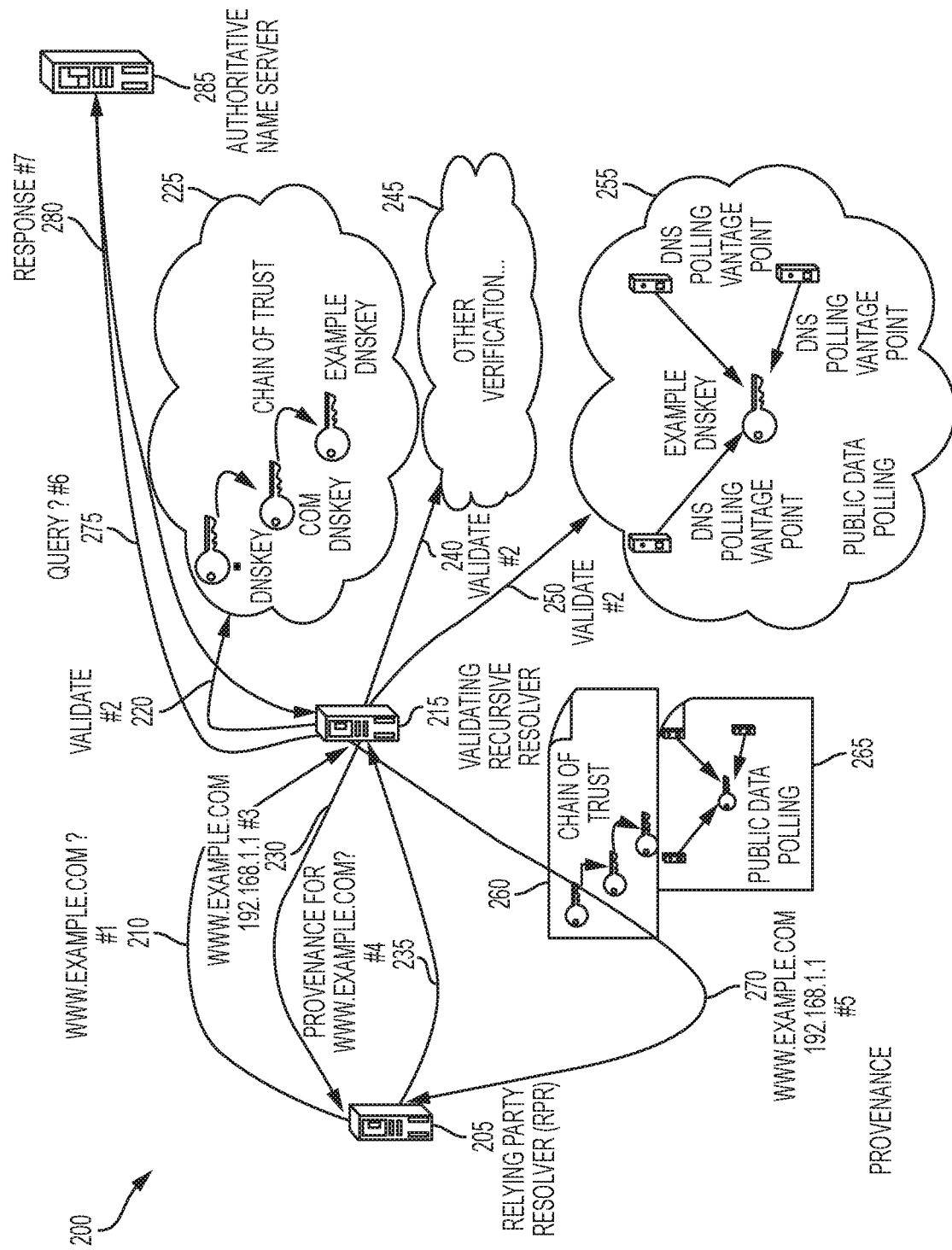
FIG. 2 shows a provenance discovery mechanism, according to examples of the present disclosure.

FIG. 2 shows a provenance discovery mechanism 200, according to examples of the present disclosure. Relying party resolver ("RPR") 205 provides DNS query 210 to validating recursive resolver ("VRR") 215 for a DNS resource record ("RR") A-type, e.g., the IP address, for www.example.com. In some examples, RPR 205 may be local recursive resolver 115, VRR 215 may be one of the ORRs 120, 125, 130, and the relying party (not shown) that communicates with RPR 205 may be computer 105, as described in FIG. 1. In some examples, VRR 215 may be configured to provide at least some of the security functionality of RPR 205 and may not be initially fully trustworthy to RPR 205. In some examples, RPR 205 may be implemented directly on computer 105 without network communication between computer 105 and RPR 205.

Query 210 from RPR 205 may be for other types of RRs, such as but not limited to, DNSSEC-specific RRs including resource record signature ("RRSIG"), DNSKEY, DS, as well as other DNS RRs. VRR 215 can provide one or more validations for the answer to query 210. The first validation 220 can be for a chain of trust validation using DNSSEC 225. RPR 205 can set a "DO" flag bit in DNS query 210. RPR 205 receives an answer via the normal DNS lookup process and RPR 205 then checks to make sure that the answer is correct. RPR 205 starts with verifying the DS and DNSKEY records at the DNS root. Then RPR 205 uses the DS records for the "corn" top level domain found at the root to verify the DNSKEY records in the "corn" zone. From there, RPR 205 checks for a DS record for the "example-.com" subdomain in the "corn" zone, and if there were, RPR 205 uses the DS record to verify a DNSKEY record found in the "example.com" zone. Finally, RPR 205 verifies the RRSIG record found in the answer for the A records for "www.example.com". If the chain of trust is verified using the above process, RPR 205 sets an "AD" flag bit in the answer 230, i.e., the IP address for www.example.com, provided to the relying party. If, on the other hand, the chain of trust is not verified, the "AD" flag bit is not set. Depending on a policy of the requestor, the unverified answer or no answer is returned.

RPR 205 can request 235 that VRR 215 provide provenance to prove that the answer 230 is correct in either case where the chain of trust is verified or not. VRR 215 can provide provenance in the form of a second validation 240 that can include other verification 245 including, but are not limited to, the reputation of the DNS provider for the authoritative name server, and WHOIS/registration data associated with a domain name (to determine, e.g., changes of registrant and/or registrar that might affect the stability of the associated zone file), whether responses are delivered over a secure communications channel as described above, zone files, zone modification request logs, error logs, and public ledgers, etc. VRR 215 can provide provenance in the form of a third validation 250 that can include public data polling information 255 and in the form of a fourth validation including both a chain of trust 260 and public data polling 265. The various provenance may thus assist RPR in its processing of a DNS query. RPR 205 may interact with multiple witnesses, e.g., multiple VRRs, and request and obtain provenance in multiple forms from these witnesses. Note that RPR 205 and VRR 215 may also send DNS queries 275 to and obtain DNS responses 280 from one or more authoritative name servers 285 as part of processing a DNS query (interaction shown only from VRR 215 in figure).

Figure 3:
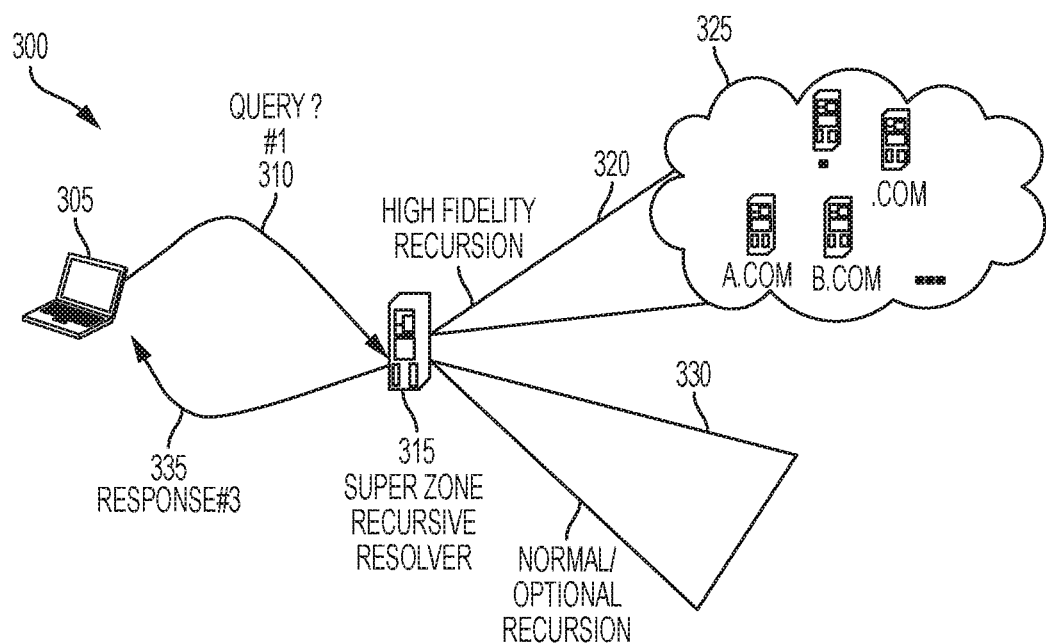
FIG. 3 shows an enhanced resolution process, according to examples of the present disclosure.

FIG. 3 shows an enhanced resolution process, according to examples of the present disclosure. Computer (requestor) 305 composes DNS query 310 using, for example, a local stub resolver (not shown) that forms DNS query 310 according to a DNS protocol. Computer 305 provides DNS query 310 to super zone recursive resolver 315 over a network (not shown). A super zone is a set of related zones above and below a given domain in the DNS delegation hierarchy. For example, super zone 325 includes the root zone ("."), the ".com" zone, child zones delegated from the ".com" zone such as "a.com" and "b.com", and possibly further descendants of these child zones. Thus, super zone 325 includes a set of related zones above and below the ".com" domain. (Note that the use of the ".com" TLD is illustrative only and the process can also be applied to other TLDs and domains. Note also that super zone 325 may be configured to include only a subset of such zones and domains.) Computer 305 is located in a domain, e.g., network, that is serviced by super zone recursive resolver 315. In some examples, super zone recursive resolver 315 may be local recursive resolver 115 or RRR 205. Super zone recursive resolver 315 may provide high-fidelity recursion for DNS records in super zone 325 by interactions described in FIG. 1 and FIG. 2. For example, super zone recursive resolver 315 may interact with ORRs 120, 125, 130, VRR 215, and/or other witnesses that have been pre-discovered in a separate discovery process and that can provide high-fidelity recursion 320 for DNS records in super zone 325. High-fidelity recursion may include witness discovery, capability negotiation, evidence-based validation, and provenance discovery, in addition to normal recursive services, as described in FIG. 1 and FIG. 2. Such high-fidelity recursion may be specialized based on particular characteristics of domains, DNS records, and/or services in super zone 325, e.g., the resolution process may be enhanced based on provenance, reputation, WHOIS data, communications channel security, etc. specific to super zone 325. As previously, witnesses can be geographically dispersed in the network and/or across networks providing topologically diverse network information to super zone recursive resolver 315 and computer 305. The geographically dispersed witnesses can provide quantifiably diverse observations of DNSKEY consistency. Super zone recursive resolver 315 may also provide normal recursive services 330 for computer 305 according to the DNS protocol, in which case super zone recursive resolver 315 process DNS query 310 in the normal way for domain names not in super zone 325, and in the enhanced way described herein for domain names in super zone 325. Super zone recursive resolver 315 may determine response 335 itself and/or by interacting with other resolvers. Alternatively, if DNS query 310 specifies a domain name that is not in super zone 325, super zone recursive resolver 315 may provide response 335 indicating that it is not configured to respond to queries not in super zone 325. Super zone recursive resolver 315 may maintain a policy (not shown) that determines the type of services to provide to requestors, such as whether to provide high-fidelity recursion 320 or normal recursive services 330. Super zone recursive resolver 315 analyzes answers received from either high-fidelity recursion 320 or the normal recursive service 330 and provides response 335 to computer 305 according to the DNS protocol over a network (not shown). In addition to interacting directly with computer 305, super zone recursive resolver 315 may also interact with local recursive resolver 115 or RPR 205 as a witness or upstream recursive resolver, e.g., as ORRs 120, 125, 130 and/or VRR 215. In other words, super zone recursive resolver 315 can be a witness suitable for a particular zone and/or feature and a relying party (e.g., local recursive resolver 115, RPR 205, and/or computer 305) can select super zone recursive resolver 315 based on a zone and/or feature interest. For example, a relying party can interact with super zone recursive resolver 315 specifically for support in resolving DNS records in the super zone 325. A relying party may interact with multiple such super zone recursive resolvers 315, for the same and/or for different super zones 325. Super zone recursive resolver 315 may advertise its capabilities and/or negotiate capabilities with a relying party according to methods described in U.S. patent application Ser. No. 14/627,506, "Balancing Visibility in the Domain Name System." Note that the specialization to super zone 325 is convenient for enhanced DNSSEC processing because the DNSSEC verification architecture follows the DNS delegation hierarchy, i.e., the zone structure. Witnesses including ORRs 120, 125, 130, VRR 215, and/or super zone recursive resolver 315 can vary based on suitability for different zones and features where a relying party can select among one or more resolvers on the basis of the zones and/or feature of interest. Witnesses may also be constructed that specialize in other features, such as TLSA records (where the recursive resolver processes evidence related to such records), or privacy (where the recursive resolver provides additional privacy protection for DNS transactions and data). The enhanced resolution process thus provides the benefit of specialization: a witness can be optimized for specific purposes, and a relying party can gain this advantage for multiple purposes by employing multiple specialized recursive resolvers.

Figure 4:
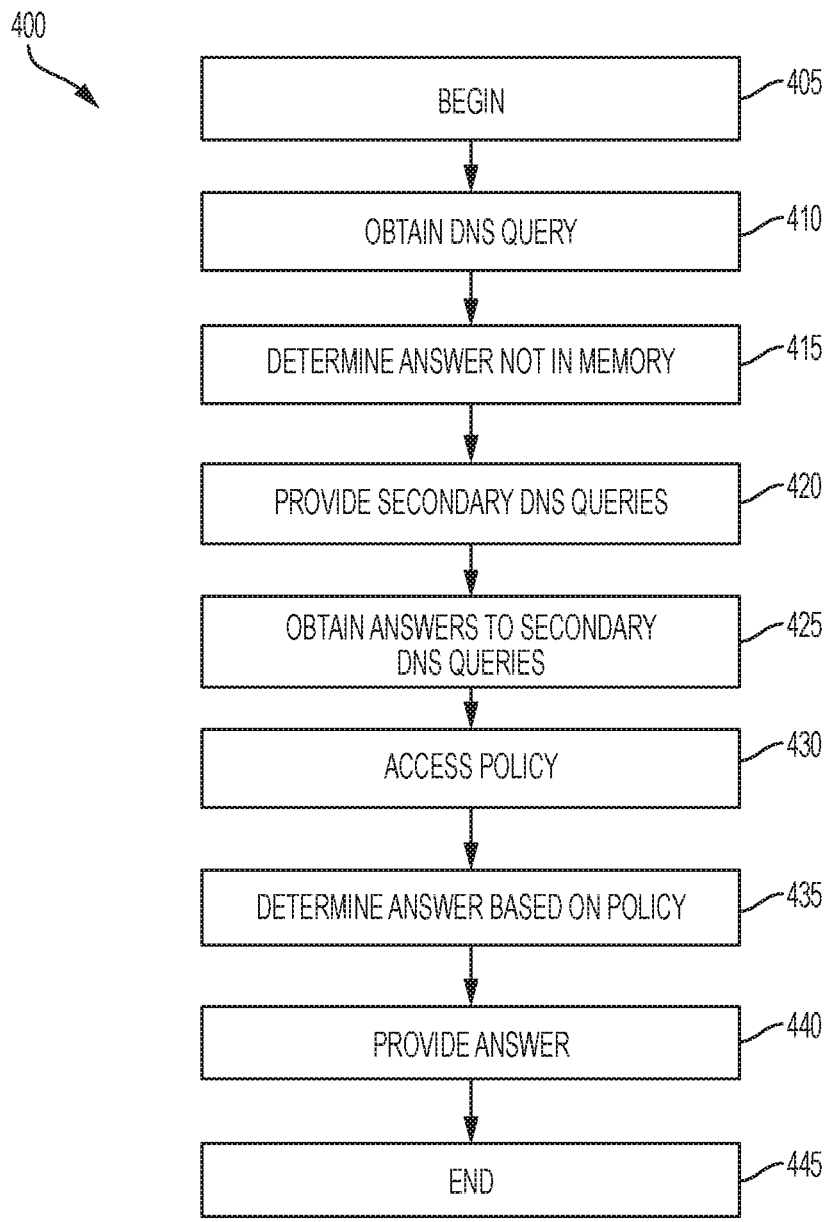
FIG. 4 shows a method for evidence-based DNS resolution according to examples of the present disclosure.

FIG. 4 shows a method 400 of resolving DNS queries, according to examples of the present disclosure. The method begins at 405. At 410, a first DNS recursive resolver, such as resolver 115, 205, or 315, obtains a first DNS query, such as query 110, 310 from a requestor, such as computer 105, 305. For example, computer 105, 305 issues a DNS query for a domain, such as www.example.com, with the DO bit set to 1 (asking for the answer using DNSSEC). At 415, at least one hardware processor of the first DNS recursive resolver determines that the first DNS recursive resolver does not contain an answer to the first query stored in a memory. If the answer is not in the memory of the recursive resolver, the recursive resolver queries one or more authoritative name servers for the answer. The recursive resolver then receives an answer with a DNSSEC key.

If, for example, the DNSSEC key for example.com (the hosting zone) does not match the DNS record for that DNSSEC key (meaning the chain of trust for that zone is broken), the recursive resolver can poll one or more witnesses that have been previously vetted and their capabilities previously negotiated to discover the DNSSEC key that they have on record for that zone. At 420, the first DNS recursive resolver provides one or more second queries to a respective one or more witnesses, i.e., second DNS recursive resolver(s), authoritative name server(s), etc. At 425, the first DNS recursive resolver obtains an answer from the one or more witnesses. At 430, the first DNS recursive resolver access from a memory a policy, wherein the policy specifies a type of associated evidence of correctness the requestor is willing to accept.

At 435, at least one hardware processor of the first DNS recursive resolver determines an answer to the first DNS query based on the policy, the one or more answers from the one or more witnesses, and evidence of correctness associated with at least one of: the one or more witnesses and the one or more answers. The associated evidence of correctness includes one or more metrics comprising a reputation score associated with a second DNS recursive resolver, a comparison of a DNSKEY record associated with the domain name record with other DNSKEY records from other open or private DNS recursive resolvers, a chain of trust associated with the domain name record, WHOIS and/or registration data associated with the domain name, communications channel security indicators, a zone file, a zone modification request log, an error log, or a public ledger. At 440, the first DNS recursive resolver provides the answer to the requestor. The answer can be also set with an AD bit set to 1, which would indicate that the policy has been met. At 445, the method ends.

Figure 5:
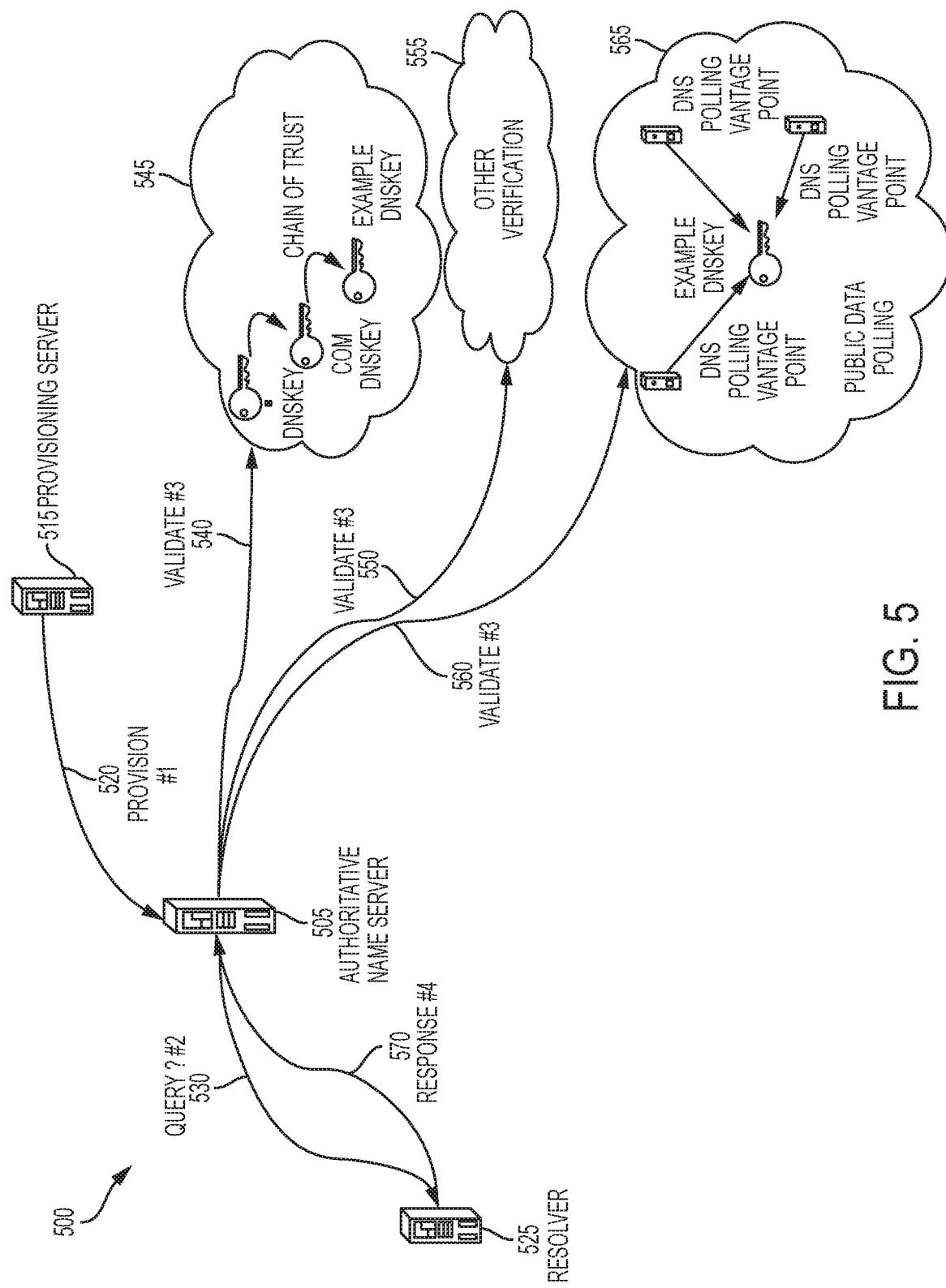
FIG. 5 shows a DNS resolution process for an authoritative name server according to examples of the present disclosure.

FIG. 5 shows a method 500 of processing queries at an authoritative name server 505. A provisioning server 515 provisions 520 one or more DNS records to be served by the authoritative name server in response to DNS queries. The DNS records may include one or more DNSKEY records as part of a DNS chain of trust, and may be provided by the provisioning server 515 in the form of zone file updates to the authoritative name server 505. Authoritative name server 505 is thereby equipped to respond to DNS queries, e.g., resolver 525 can send DNS query 530 and authoritative name server 505 can return response 570, according to the DNS records/zone file provided to authoritative name server 505 by provisioning server 515. Authoritative name server 505 can obtain and optionally provide one or more validations for the answer 570 to query 530, and/or for its own assurance of the accuracy of the responses 570 it provides. The first validation 540 can be for a chain of trust validation using DNSSEC 545.

As a remediation to the possibility of instability in the provisioning system for zone file updates and/or to the possibility of inaccuracies at other authoritative name servers provisioned by provisioning server 515, and/or according to its local policy, authoritative name server 505 may also employ evidence-based validation as described herein, and/or evidence-based DNS resolution more generally, to increase its assurance of the correctness and appropriateness of the DNS records it is serving in response to queries. For example, provisioning server 515 may have had an outage and/or may have been compromised, and may have not provided DNS records including associated DNSSEC records accurately, in a timely manner, or otherwise in compliance with an external process, and/or consistent with obligations of the operator of the authoritative server to serve DNS records to its community of requesters (which may be local, regional, or global). In particular, authoritative name server 505 may itself consult one or more witnesses and/or obtain provenance, as supplementary evidence, e.g., authoritative name server 505 may obtain, validate and optionally provide provenance in the form of a second validation 550 that can include other verification 555 including, but are not limited to, WHOIS/registration data associated with a domain name (to determine, e.g., changes of registrant and/or registrar that might affect the stability of the associated zone file); whether responses are delivered over a secure communications channel, zone files, zone modification request logs, error logs, and public ledgers, etc. Authoritative name server 505 can obtain, validate and optionally provide provenance in the form of a third validation 560 that can include public data polling information 565. The various provenance, which may be considered in combination, may thus assist authoritative name server 505 and possibly resolver 525 in its processing of a DNS query. Authoritative name server 505 may thereby offer higher assurance than other authoritative name servers provisioned for the same zone, and/or complementary assurance based on the diversity of its sources of evidence.

In some examples, prior to the first DNS recursive resolver providing the plurality of second queries, the first DNS resolver can provide a third query to an authoritative name server, where the first DNS resolver can obtain an answer from the authoritative name server and determine that the answer is not secured using DNSSEC.

In some examples, the first DNS recursive resolver can rank a plurality of second DNS recursive resolvers based on reputation and select the one or more second DNS recursive resolver to use to answer the first DNS query based on the ranking.

In some examples, the first DNS recursive resolver can provide a request to a trusted third party for a list of second DNS recursive resolvers, obtain the list from the trusted third party; and select the one or more second DNS recursive resolvers from the list. In some examples, the first DNS recursive resolver can determine that a particular second DNS recursive resolver from the one or more of DNS recursive resolvers is better at a particular task and/or particular zone than others of the plurality of second DNS recursive resolvers and select the one or more second DNS recursive resolvers to use to answer the first DNS query based on the determining.

In some examples, the first DNS recursive resolver can provide the evidence of correctness associated with the one or more second DNS recursive resolvers and/or the one or more answers to the requestor. For example, each witness can provide to the first DNS recursive resolver a DNSSEC key query, the DNS response, and a timestamp for each. The first DNS recursive resolver can provide this information from one or more of the witnesses along with the source IP address based on the queries to the witnesses to the requestor as the evidence and proof of the correctness of the answer. The policy associated with the requestor at the first DNS recursive resolver can set a particular threshold of witnesses needed for an answer to be determined to be correct. For example, if ⅔ of the witnesses return the same DNSSEC key, then the answer will be assumed to be correct. This threshold can be changed based on the degree of tolerance that the requestor is willing to accept, and the degree of trust it places in the selected witnesses. If the requestor is not willing to accept the possibility that an answer is being spoofed, then the policy can set so that all the polled witnesses have to agree on the DNSSEC key.

Figure 6:
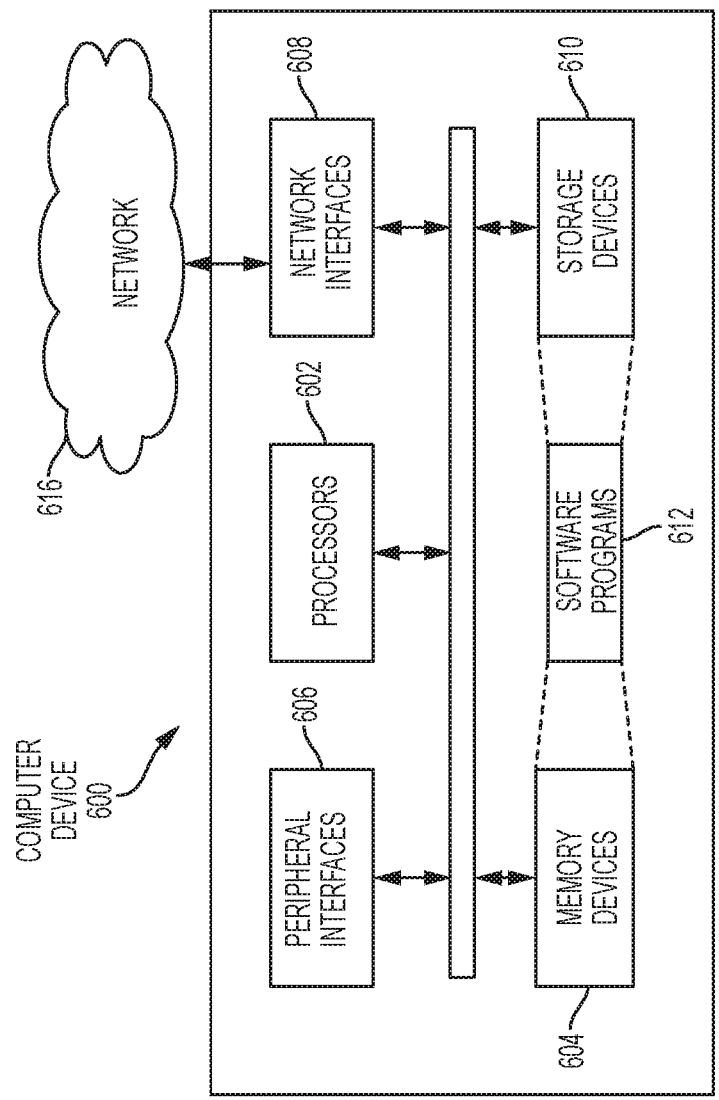
FIG. 6 is an example computer system for performing the disclosed implementations, consistent with the present disclosure.

FIG. 6 illustrates an example of a hardware configuration for a computer device 600 that can be used as mobile device or server, which can be used to perform one or more of the processes described above. While FIG. 6 illustrates various components contained in the computer device 600, FIG. 6 illustrates one example of a computer device and additional components can be added and existing components can be removed.

The computer device 600 can be any type of computer devices, such as desktops, laptops, servers, DNS server, etc., or mobile devices, such as smart telephones, tablet computers, cellular telephones, personal digital assistants, etc. As illustrated in FIG. 6, the computer device 600 can include one or more processors 602 of varying core configurations and clock frequencies. The computer device 600 can also include one or more memory devices 504 that serve as a main memory during the operation of the computer device 600. For example, during operation, a copy of the software that supports the DNS operations can be stored in the one or more memory devices 604. The computer device 600 can also include one or more peripheral interfaces 606, such as keyboards, mice, touchpads, computer screens, touchscreens, etc., for enabling human interaction with and manipulation of the computer device 600.

The computer device 600 can also include one or more network interfaces 608 for communicating via one or more networks, such as Ethernet adapters, wireless transceivers, or serial network components, for communicating over wired or wireless media using protocols. The computer device 600 can also include one or more storage device 610 of varying physical dimensions and storage capacities, such as flash drives, hard drives, random access memory, etc., for storing data, such as images, files, and program instructions for execution by the one or more processors 602.

Additionally, the computer device 600 can include one or more software programs 612 that enable the functionality described above. The one or more software programs 612 can include instructions that cause the one or more processors 602 to perform the processes described herein. Copies of the one or more software programs 612 can be stored in the one or more memory devices 604 and/or on in the one or more storage devices 610. Likewise, the data, for example, the super zone data, utilized by one or more software programs 612 can be stored in the one or more memory devices 604 and/or on in the one or more storage devices 610.

In implementations, the computer device 600 can communicate with other devices via a network 616. The other devices can be any types of devices as described above. The network 616 can be any type of electronic network, such as a local area network, a wide-area network, a virtual private network, the Internet, an intranet, an extranet, a public switched telephone network, an infrared network, a wireless network, and any combination thereof. The network 616 can support communications using any of a variety of commercially-available protocols, such as TCP/IP, UDP, OSI, FTP, UPnP, NFS, CIFS, AppleTalk, and the like. The network 616 can be, for example, a local area network, a wide-area network, a virtual private network, the Internet, an intranet, an extranet, a public switched telephone network, an infrared network, a wireless network, and any combination thereof.

The computer device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 600 as described above need not be enclosed within a single enclosure or even located in close proximity to one another. Those skilled in the art will appreciate that the above-described componentry are examples only, as the computer device 600 can include any type of hardware componentry, including any necessary accompanying firmware or software, for performing the disclosed implementations. The computer device 600 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method of resolving one or more Domain Name System (DNS) queries for a domain name record, the method comprising:

determining, by a hardware processor of a computer, a plurality of witnesses, wherein at least one of the plurality of witnesses is configured for a specific purpose;

selecting, by the computer, the at least one of the plurality of witnesses based on at least one of the one or more DNS queries;

providing, by the computer, one or more queries based on the at least one of the one or more DNS queries to the selected at least one of the plurality of witnesses;

obtaining, by the computer, one or more first answers to the one or more queries based on the at least one of the one or more DNS queries from the selected at least one of the plurality of witnesses; and determining, by the hardware processor of the computer, a second answer to the at least one of the one or more DNS queries based on the one or more first answers from the selected at least one of the plurality of witnesses.

2. The computer-implemented method of claim 1, further comprising obtaining the at least one of the one or more DNS queries from a requestor.

3. The computer-implemented method of claim 2, further comprising providing, by the computer, the second answer to the requestor.

4. The computer-implemented method of claim 1, wherein the computer comprises a DNS recursive resolver, a non-recursive resolver, a non-resolver witness, a stub resolver, or an authoritative name server.

5. The computer-implemented method of claim 1, wherein a witness of the plurality of witnesses comprises a DNS recursive resolver, a non-recursive resolver, a non-resolver witness, stub resolver, or an authoritative name server.

6. The computer-implemented method of claim 1, wherein a first witness of the plurality of witnesses is configured to provide a response with an indication that the first witness is not configured to respond to the at least one of the one or more queries based on the at least one of the one or more DNS queries with the specific purpose.

7. The computer-implemented method of claim 1, wherein the specific purpose comprises one or more zones of interest, one or more features of interest, one or more super zones, one or more sets of domains in a DNS hierarchy, one or more sets of DNS record types, a particular task, or a particular zone.

8. The computer-implemented method of claim 1, further comprising:
providing, by the computer, a request to a trusted third party for a list of the plurality of witnesses;
obtaining the list from the trusted third party; and
selecting one or more witnesses from the list.

9. The computer-implemented method of claim 2, wherein a witness of the plurality of witnesses provides specialized features comprising providing a Transport Layer Security Association (TLSA) record or providing privacy for the requestor.

10. A computer comprising:
one or more processors; and
a memory system comprising one or more non-transitory computer-readable media storing instructions that, when executed by at least one of the one or more processors, cause a Domain Name System (DNS) recursive resolver to perform operations for resolving one or more DNS queries, the operations comprising:

determining a plurality of witnesses, wherein at least one of the plurality of witnesses is configured for a specific purpose;
selecting the at least one of the plurality of witnesses based on at least one of the one or more DNS queries;
providing one or more queries based on the at least one of the one or more DNS queries to the selected at least one of the plurality of witnesses;
obtaining one or more first answers to the one or more queries based on the at least one of the one or more DNS queries from the selected at least one of the plurality of witnesses; and
determining a second answer to the at least one of the one or more DNS queries based on the one or more first answers from the selected at least one of the plurality of witnesses.

11. The computer of claim 10, wherein the operations further comprise obtaining the at least one of the one or more DNS queries from a requestor.

12. The computer of claim 11, wherein the operations further comprise providing the second answer to the requestor.

13. The computer of claim 10, wherein the computer comprises a DNS recursive resolver, a non-recursive resolver, a non-resolver witness, a stub resolver, or an authoritative name server.

14. The computer of claim 10, wherein a witness of the plurality of witnesses comprises a DNS recursive resolver, a non-recursive resolver, a non-resolver witness, a stub resolver, or an authoritative name server.

15. The computer of claim 10, wherein a first witness of the plurality of witnesses is configured to provide a response with an indication that the witness is not configured to respond to the at least one of the one or more queries based on the at least one of the one or more DNS queries with the specific purpose.

16. The computer of claim 10, wherein the specific purpose comprises one or more zones of interest, one or more features of interest, one or more super zones, one or more sets of domains in a DNS hierarchy, one or more sets of DNS record types, a particular task, or a particular zone.

17. The computer of claim 10, wherein the operations further comprise:
providing a request to a trusted third party for a list of the plurality of witnesses;
obtaining the list from the trusted third party; and
selecting one or more witnesses from the list.

18. The computer of claim 11, wherein a witness of the plurality of witnesses provides specialized features comprising a providing a Transport Layer Security Association (TLSA) record or providing privacy for the requestor.

19. A non-transitory computer-readable medium comprising instructions which, when executed by at least one processor, cause the at least one processor to perform a method for resolving one or more Domain Name System (DNS) queries, comprising:
determining, by a hardware processor of a computer, a plurality of witnesses, wherein at least one of the plurality of witnesses is configured for a specific purpose;
selecting, by the computer, the at least one of the plurality of witnesses based on at least one of the one or more DNS queries;
providing, by the computer, one or more queries based on the at least one of the one or more DNS queries to the selected at least one of the plurality of witnesses;
obtaining, by the computer, one or more first answers to the one or more queries based on the at least one of the one or more DNS queries from the selected at least one of the plurality of witnesses; and
determining, by the hardware processor of the computer, a second answer to the at least one of the one or more DNS queries based on the one or more first answers from the selected at least one of the plurality of witnesses.

20. The non-transitory computer-readable medium of claim 19, further comprising obtaining the at least one of the one or more DNS queries from a requestor and providing the second answer to the requestor.

* * * * *